United States Patent
Amblard

(10) Patent No.: US 7,114,460 B2
(45) Date of Patent: Oct. 3, 2006

(54) PROCESS AND INSTALLATION FOR RECONDITIONING ALIVE AQUATIC ANIMALS, IN PARTICULAR FOR THE AQUARIUMS

(75) Inventor: Frederic Amblard, Mazamet (FR)

(73) Assignee: Amblard SA, Mazamet (FR)

( * ) Notice: Subject to any disclaimer, the term of this patent is extended or adjusted under 35 U.S.C. 154(b) by 125 days.

(21) Appl. No.: 10/820,053

(22) Filed: Apr. 8, 2004

(65) Prior Publication Data

US 2004/0244711 A1 Dec. 9, 2004

(51) Int. Cl.
 *A01K 61/00* (2006.01)
(52) U.S. Cl. .................. 119/203; 119/231; 119/268
(58) Field of Classification Search ................ 119/203, 119/200, 204, 211, 215, 226, 231, 259, 264, 119/268

See application file for complete search history.

(56) References Cited

U.S. PATENT DOCUMENTS 5,186,121 A 2/1993 Smith, Jr.

OTHER PUBLICATIONS

Patent Abstracts of Japan vol. 2000, No. 04, Aug. 31, 2000 & JP 2000 023595 A (Nagaura Yoshiaki), Jan. 25, 2000.
Patent Abstracts of Japan vol. 016, No. 496 (C-0995), Oct. 14, 1992 & JP 04 183342 A (Nichii:KK;Others: 01), Jun. 30, 1992.
Patent Abstracts of Japan vol. 015, No. 193 (C-0832), May 17, 1991 & JP 03 049630 A Nabitsukusu Rain KK), Mar. 4, 1991.
Database WPI Week 198306 Derwent Publications Ltd., London, GB; AN 1983-13966K XP002266164 & JP 57 022632 A (Asahi Chem), Feb. 5, 1982.

*Primary Examiner*—Yvonne R. Abbott
(74) *Attorney, Agent, or Firm*—Young & Thompson

(57) ABSTRACT

Process for reconditioning a hermetic package (12) containing water (14P) and at least one alive aquatic animal (16), in particular intended for aquariums, the aim being to extend the maximum duration of transportation while keeping the animal alive, which includes the following steps:
 (a) opening the package (12) to access the water (14P) contained in it since the initial packing;
 (b) replacing all or some of the polluted transportation water (14P) with an unpolluted reconditioning water (26) prepared in such a way as to present physical and chemical parameters analogous to those of the polluted water (14P), and in particular at least a substantially identical pH value;
 (c) re-closing the package (12) in a leaktight manner in order to permit a further stage of transportation.

12 Claims, 1 Drawing Sheet

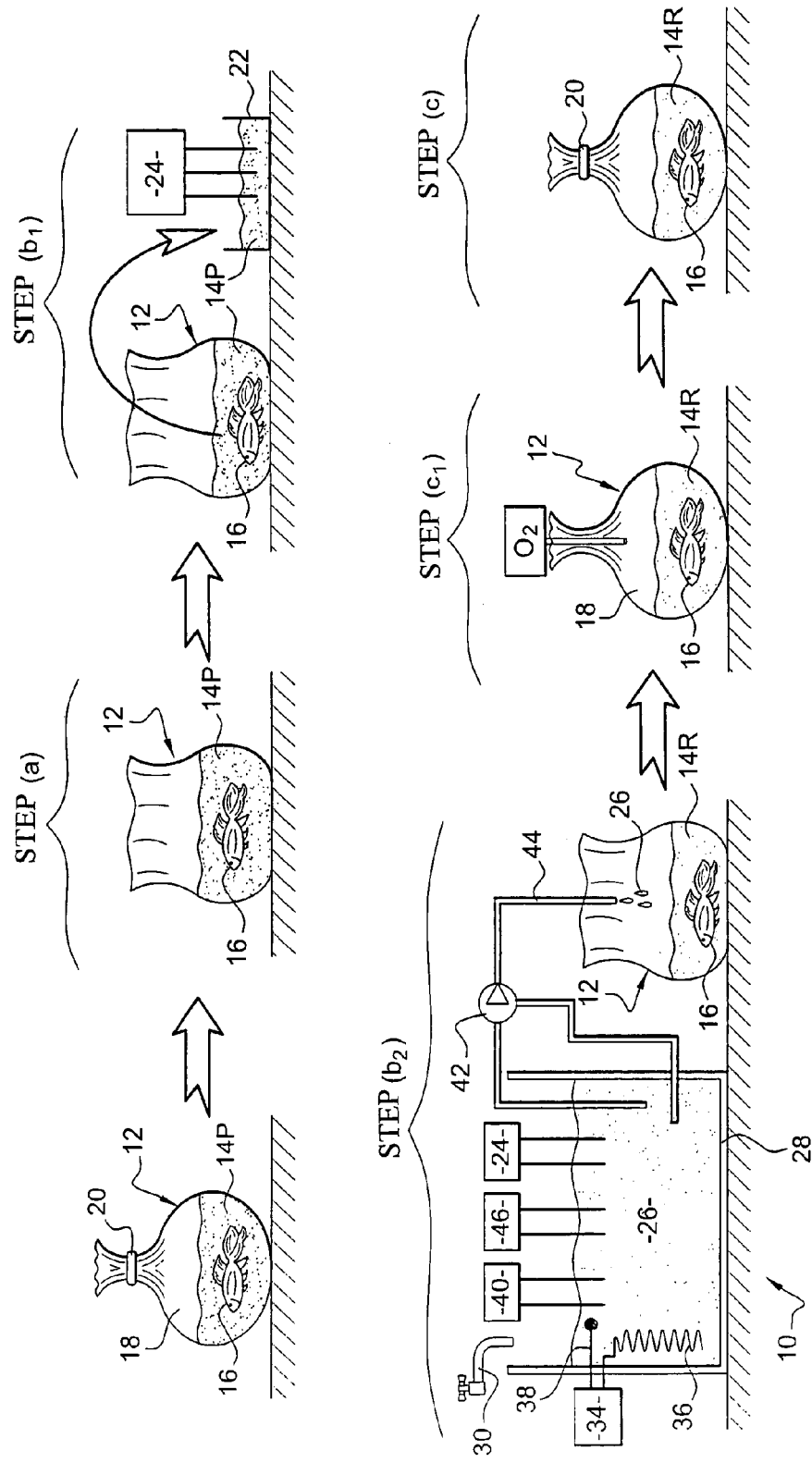

PROCESS AND INSTALLATION FOR RECONDITIONING ALIVE AQUATIC ANIMALS, IN PARTICULAR FOR THE AQUARIUMS

The invention relates to a process for reconditioning alive aquatic animals intended in particular for aquariums, and to an installation for implementation of this reconditioning process.

The invention more particularly relates to a process for reconditioning a hermetic package containing water and at least one alive aquatic animal, the aim being to extend the maximum duration of transportation while keeping the animal alive.

Alive aquatic animals, for example tropical fish or corals, are the subject of an international trade most often intended to procure specimens for aquariums.

These aquatic animals are thus exported form their country or geographic area of origin to different countries, which requires packing them for this transportation and, in particular, for the duration of said transportation.

Because of the distances between the country in which the initial packing is done and the country in which the delivery is finally made, the duration of transportation may be considerable. It is for this reason that the transportation of aquatic animals is generally done by air so as to reduce as much as possible the duration of this transportation.

Throughout the duration of the transportation, the alive aquatic animals are packed individually, for example, in a package containing a certain quantity of water and one or more animals.

Such a package means that the alive animal being transported can be kept temporarily in good conditions, especially in good sanitary conditions, but this duration is necessarily limited.

The reason for this is that, beyond a certain period of time, the transportation water polluted by the animal becomes unfit for the animal and so poses considerable risks, such as the development of various diseases which may even lead to the death of the animals.

It will therefore be appreciated that such a situation is unacceptable, both for the animals themselves, which must be protected, and also for the persons trading in these animals.

However, the transportation time cannot always be controlled. For example, the period required is sometimes too long or is sometimes prolonged by unforeseen circumstances such as logistical problems attributable to air traffic, weather conditions, strikes, etc.

The risks of disease or death to which the animals are exposed before they arrive at their final destination are therefore considerable.

These risks are associated, on the one hand, with poisoning of the animals, in particular because of the presence of an excessive amount of ammonia and carbon dioxide, leading for example to breathing problems and osmotic and ionic imbalances, and, on the other hand, with changes in the transportation water contained in the package, the main cause of these changes being two phenomena called anoxia and acidosis.

The level of oxygen will in fact progressively decrease as the animal absorbs it for its respiratory needs, and this is what is called anoxia.

Moreover, the animal eliminates organic waste which is the cause of pollution of the water by noxious substances such as ammonia, of which the concentration in the water will gradually increase and lead to a change in the pH value, and this is what is called acidosis.

In conclusion, for each aquatic animal, the acceptable duration of transportation is known, taking into consideration the pollution of the transportation water and the consequences of this for the animal.

It will be readily appreciated that, for the commercial activity concerned with the transportation of live aquatic animals, time is a considerable concern and an important cost factor.

However, there are presently no solutions for increasing the maximum duration of transportation and guaranteeing to keep the live aquatic animals in good conditions, especially when problems such as unforeseen delays occur during transportation.

With this aim in mind, the invention proposes a process for reconditioning a package of the type described above, characterized in that it comprises at least the following steps, which consist in:

a) opening the package to access the water contained in it since the initial packing;

(b) replacing all or some of the polluted transportation water with unpolluted reconditioning water prepared in such a way as to present physical and chemical parameters analogous to those of the polluted water, and in particular at least a substantially identical pH value;

(c) re-closing the package in a leaktight manner in order to permit a further stage of transportation.

By virtue of the reconditioning process according to the invention, it is possible to extend the maximum duration of transportation while keeping the animal alive.

Advantageously, the reconditioning process is inexpensive to implement, so that it is possible to act very quickly on a batch of packages to be reconditioned in which the animals are at risk, and to do so for a period of immobilization corresponding only to the time needed to recondition the packages, which can then be forwarded rapidly to their final delivery destination.

According to other characteristics of the invention:

the reconditioning process comprises a step (b1) of characterizing the polluted transportation water, which step comprises measuring different physical and chemical parameters of the polluted transportation water to be replaced, in such a way as to determine those of the reconditioning water to be prepared;

the different physical and chemical parameters for preparation of the reconditioning water according to step (b1) are determined from a table of known values which are a function of the animal and/or of the place of initial packaging;

the reconditioning process comprises a step (b2) of preparing the reconditioning water, comprising at least one of the following operations:

purifying freshwater from a network of drinking water, or seawater, by all suitable treatments;

measuring and modifying the physical and chemical parameters of the reconditioning water in such a way as to obtain parameters analogous to those of the polluted transportation water;

the physical and chemical parameters of the reconditioning water which are measured and modified include the temperature and/or the electrical conductivity;

the reconditioning water contains at least one additive product for neutralizing all or some of the ammonia produced regularly by the animal, in such a way as to delay the onset of the phenomenon of acidosis of the water;

the reconditioning water contains at least one additive product capable of releasing oxygen over time, so as to re-oxygenate the water and delay the onset of the phenomenon of anoxia;

the reconditioning process comprises a subsidiary step (c1) prior to closure, consisting in oxygen enrichment of the free volume of the package above the reconditioned water.

The invention also proposes an installation for implementation of the reconditioning process, which comprises:

at least one tank for preparation of the reconditioning water;

means for creating a permanent circulation of water, such as a mixer and/or a pump;

means for regulating the temperature of the reconditioning water;

means for measuring and automatically correcting the pH of the reconditioning water;

means for measuring and automatically correcting the electrical conductivity.

the installation comprises at least one tank for storage of the reconditioning water, comprising means for creating a permanent circulation of water and/or means for regulating the temperature of the reconditioning water, and/or means for measuring and automatically correcting the pH of the reconditioning water, and/or means for measuring and automatically correcting the electrical conductivity;

the installation comprises specific lighting means and/or means for monitoring and regulating the temperature of the ambient air in such a way as to favor the housing of the aquatic animals.

Other characteristics and advantages of the invention will become clear from reading the following detailed description in which reference is made to the attached single FIGURE which is a diagrammatic representation showing, in succession, a package containing water and a live aquatic animal during the main stages of the reconditioning process according to the invention.

In the following description, identical reference numbers designate elements which are identical or which have similar functions.

Following convention, the terms "left", "right", "upper" and "lower" designate elements or positions oriented, respectively, to the left, right, top and bottom of the single FIGURE.

At the top left of the FIGURE, a package 12 is shown which contains water 14P and at least one live aquatic animal 16, in this case a fish, in the state prior to the reconditioning according to the invention.

The package 12 is hermetic and consists, for example, of a bag of plastic material, either transparent or opaque.

As can be seen from the FIGURE, the package 12 is in this case partially filled with water 14P so that the total volume of the package 12 includes a volume of water 14P, occupying the lower part, and a volume of gas 18, generally air, in the upper part.

The package 12 is closed at its upper part by closure means 20, preferably in a leaktight manner.

The closure means 20 are, for example, in the form of removable means such as a peg, a clip or an elastic band so as to permit successive opening and closing without damaging the package 12, alternatively by a heat-sealing operation.

In the reconditioning process according to the invention, the package 12 is opened, in a preliminary step (a), in order to gain access to the polluted transportation water 14P contained in the package since the initial packing.

The general state of the transportation package 12 is advantageously checked and, if necessary, it is changed during the reconditioning.

Then, during a step (b1) which involves characterizing the polluted transportation water 14P, a sample is taken with the aid of a receptacle 22, or any other suitable means, in order to perform analyses and measurements to determine the physical and chemical parameters of the polluted transportation water 14P.

The different physical and chemical parameters to be determined are in particular the pH value of the polluted transportation water 14P, and also the temperature and/or the electrical conductivity.

These physical and chemical parameters are determined with the aid of well known and conventional means 24 such as a pH meter or pH paper, a thermometer and a conductivity meter, which will therefore not be described in detail here.

Alternatively, the measuring means 24 are introduced directly into the open package 12 in accordance with step (a).

For seawater, the density is also determined.

The step (b1) of characterizing the polluted water 14P to be replaced makes it possible to determine in a precise and reliable manner those of a reconditioning water 26 which is prepared in the following step (b2).

At least two series of measurements according to step (b1) are preferably performed in order to guarantee the reliability of the results.

Step (b2), involving preparation of the reconditioning water 26, comprises in particular a first operation consisting in purifying, by any suitable means of treatment, freshwater originating generally from a network of drinking water, or else seawater, either natural or artificial, depending on the types of aquatic animals.

The quality of the reconditioning water 26 must be the best possible in order to obtain the maximum extension of the duration of transportation, while at the same time taking into consideration the specific nature of each aquatic animal 16, because the fragility and sensitivity of the animal may vary according to the species.

Therefore, at least some of the reconditioning water 26 is made up, for example, of water which has undergone osmosis and which may be mixed with freshwater.

The water subjected to osmosis is a freshwater which is treated with a view to being softened, that is to say treated so as to remove mineral salts, and which has a hardness of the order of a few microsiemens and a pH value of the order of 6.5 to 7.

It is also possible to carry out various treatments, such as filtration, in order to eliminate impurities, and also treatment by chlorination, by radiation or by heating, in such a way as to remove in particular all the pathogenic agents.

The freshwater is thus preferably filtered with the aid of sediment filters and/or filters containing activated charcoal.

The water is then treated by chlorination in order to destroy the pathogenic agents, and an anti-chlorine additive, such as sodium thiosulphate, is then added to neutralize, in the reconditioning water 26, any trace of chlorine which would be harmful to the animals.

A filtration performed under ultraviolet lamps makes it possible, for example, to eliminate bacteria, viruses and other unicellular or multicellular organisms.

During step (b2), the physical and chemical parameters of the reconditioning water 26 are measured and modified during a second operation in such a way as to obtain parameters analogous to those of the polluted transportation water 14P.

The measurement means used for step (b2) are analogous here to the means 24 employed in step (b1).

The reconditioning water 26 is produced in at least one preparation tank 28 which belongs to an installation 10 for implementation of the reconditioning process according to the invention.

The tank 28 is connected via one or more connection conduits 30 to a network of freshwater and/or to storage tanks holding water that has undergone osmosis, or else to storage tanks holding natural or artificial seawater.

The preparation tank 28 comprises measuring means 24 and means for modifying the physical and chemical parameters of the reconditioning water 26 until parameters are obtained which are analogous to those of the polluted transportation water 14P to be replaced.

The preparation tank 28 here comprises means 34 for regulating the temperature of the water 26, such as a resistive element 36 which is used for heating the water and whose control is coupled to a heat sensor 38 in such a way as to constitute a system self-regulated on the basis of reference values.

In the same way, the tank 28 is provided with a control pump 40 which, in order to modify the pH of the reconditioning water 26, permits appropriate addition of a base or of an acid, most often an acid such a hydrochloric acid or carbon dioxide.

It is important that the reconditioning water 26 prepared according to step (b2) have a pH index substantially identical to the polluted transportation water because the aquatic animals are generally very sensitive to this, with the result that a substantial pH difference between the polluted water 14P and the reconditioning water 26 would be likely to affect them.

Moreover, the tank 28 comprises a pump 42 which maintains a continuous circulation of water, thereby avoiding any stagnation, and which, after switching of a valve for example, allows the reconditioning water 26, thus prepared, to be removed via a tube 44 to a storage tank (not shown) or directly into the package 12, to replace all or some of the polluted transportation water 14P.

The tank 28 also comprises means 46 for automatically measuring and automatically correcting the electrical conductivity.

The polluted transportation water 14P can be removed from the package 12 either after or in parallel with the implementation of steps (b1) or (b2).

When all of the polluted transportation water 14P is replaced by reconditioning water 26, or when it is necessary to change the package 12, the aquatic animals 16 can be placed temporarily in holding vessels (not shown) containing reconditioning water 26.

For safety's sake, and in order to prevent any failure or problem of calibration of the means 24, 34, 40 associated with the tank 28 for preparing the reconditioning water 26 according to step (b2), replacement of the water 14P is preceded by measures which involve checking the reconditioning water 26 with conventional means such as those 24 used, for example, during step (b1).

The reconditioning water 26 advantageously comprises one or more additive products which, for example, are capable of:

neutralizing all or some of the ammonia produced regularly by the animal during transportation, so as to delay the onset of the phenomenon of acidosis of the water in the package 12;

and/or releasing oxygen, over time, so as to re-oxygenate the water in the package 12 and delay the onset of the phenomenon of anoxia.

Such additives make it possible to further increase the maximum duration of transportation while not only keeping the animal alive, but also keeping it in good transportation conditions.

Alternatively, steps (b1) and (b2) are omitted and are replaced by a step (b0) which, after step (a), consists in adding such additives to the polluted transportation water 14P in order to extend the maximum duration of transportation while keeping the animal alive.

Thus, the "preparation" of the so-called reconditioning water is carried out "in situ" in the package 12.

It is also possible to add other additives having properties beneficial to the animal, in particular anti-stress or anaesthetizing properties or anti-bacterial properties in order to limit the development of pathogenic agents in the water.

In a variant of step (b1), the different physical and chemical parameters of the polluted transportation water 14P to be replaced are determined from a table of known values which are a function of the animal and/or of the place of initial packing of this aquatic animal 16.

Such tables of values advantageously allow reconditioning water 26 to be prepared even before a batch of packages 12 containing live aquatic animals 16 has arrived at the site of the installation 10, to be reconditioned there in accordance with the invention.

The time needed for the reconditioning is thereby reduced, and it is consequently possible to recondition one or more batches in a very short time.

The reconditioning water 26 is preferably prepared according to the parameters in such tables of values, and it is stored in a storage tank equipped with means, analogous to those described above, for measuring and modifying the physical and chemical parameters.

The storage tank advantageously comprises means for creating a permanent circulation of water and/or means for regulating the temperature of the reconditioning water and/or means for measuring and automatically correcting the pH of the reconditioning water and/or means for measuring and automatically correcting the electrical conductivity so that, if necessary, they are corrected as a function of the results of an automatic characterization of the type carried out according to step (b1), as a safety measure.

The reconditioning process then comprises a subsidiary step (c1) prior to closure and consisting in oxygen enrichment of the remaining free volume 18 of the package 12 above the reconditioned water 14R, some of this oxygen dissolving directly in the water.

The quantity of oxygen added depends on the aquatic animal 16 contained in the package 12. This is because some species of fish have a respiratory system adapted to breathe atmospheric air, so the presence of too much oxygen could be harmful.

Finally, during a final step (c), the package 12 is closed hermetically to permit a further stage of transportation, such as forwarding to a final destination, which would not previously have been possible without the risk of putting the life of the animals in danger on account of too long a period of transportation.

The installation 10 can also comprise specific lighting means (not shown) such as a lighting of the "red light" type which is able to create a peaceful environment which limits the stress suffered by the animals during the reconditioning, since this light is not seen by animals such as fish.

The installation 10 can comprise equipment permitting destruction of spoilt or damaged packages, and the treatment of the polluted water by denaturation before discharge.

The installation 10 can also comprise means (not shown) for monitoring and regulating the temperature of the ambient air so as to favor the housing of the aquatic animals.

The installation 10 is advantageously automated to prepare the reconditioning water 26 according to the physical and chemical parameters programmed.

The reconditioned packages 12 can be grouped together in batches in containers (not shown), in particular according to their destination.

The transportation containers or the reconditioned packages 12 advantageously comprise means for keeping the reconditioned water 14R in particular at a constant temperature of the order of 20° C. during transportation in order to protect the aquatic animals 16 from possible thermal shock due to excessive temperature variations.

These means consist, for example, of heating means such as "warmers" placed in the containers near the packages 12 and/or of thermal insulation means such as newspaper or films of the type used for survival blankets, so as to reduce the exchanges with the ambient air.

The transport containers are advantageously made of a material having thermal insulation properties, for example polystyrene.

The invention claimed is:

1. Process for reconditioning a hermetic package (12) containing water (14P) and at least one live aquatic animal (16), in particular intended for aquariums, the aim being to extend the maximum duration of transportation while keeping the animal alive, characterized in that it comprises at least the following steps, which consist in:
   (a) opening the package (12) to access the water (14P) contained in it since the initial packing;
   (b) replacing all or some of the polluted transportation water (14P) with an unpolluted reconditioning water (26) prepared in such a way as to present physical and chemical parameters analogous to those of the polluted water (14P), and in particular at least a substantially identical pH value;
   (c) re-closing the package (12) in a leaktight manner in order to permit a further stage of transportation.

2. Reconditioning process according to claim 1, characterized in that it comprises a step (b1) of characterizing the polluted transportation water (14P), which step comprises measuring different physical and chemical parameters of the polluted transportation water (14P) to be replaced, in such a way as to determine those of the reconditioning water (26) to be prepared.

3. Reconditioning process according to claim 2, characterized in that the different physical and chemical parameters for preparation of the reconditioning water (26) according to step (b1) are determined from a table of known values which are a function of the animal and/or of the place of initial packing.

4. Reconditioning process according to claim 3, characterized in that it comprises a step (b2) of preparing the reconditioning water (26), comprising at least one of the following operations:
   purifying freshwater from a network of drinking water, or seawater, by all suitable treatments;
   measuring and modifying the physical and chemical parameters of the reconditioning water (26) in such a way as to obtain parameters analogous to those of the polluted transportation water (14P).

5. Reconditioning process according to claim 2, characterized in that it comprises a step (b2) of preparing the reconditioning water (26), comprising at least one of the following operations:
   purifying freshwater from a network of drinking water, or seawater, by all suitable treatments;
   measuring and modifying the physical and chemical parameters of the reconditioning water (26) in such a way as to obtain parameters analogous to those of the polluted transportation water (14P).

6. Reconditioning process according to claim 5, characterized in that physical and chemical parameters of the reconditioning water (26) are measured and modified and include the temperature and/or the electrical conductivity.

7. Reconditioning process according to claim 1, characterized in that the reconditioning water (26) contains at least one additive product for neutralizing all or some of the ammonia produced regularly by the animal, in such a way as to delay the onset of the phenomenon of acidosis of the water.

8. Reconditioning process according to claim 1, characterized in that the reconditioning water (26) contains at least one additive product capable of releasing oxygen over time, so as to re-oxygenate the water and delay the onset of the phenomenon of anoxia.

9. Reconditioning process according to claim 1, characterized in that it comprises a subsidiary step (c1) prior to closure, consisting in oxygen enrichment of the free volume (18) of the package (12) above the reconditioned water (14R).

10. Installation (10) for implementation of the reconditioning process according to claim 1, characterized in that it comprises:
    at least one tank (28) for preparation of the reconditioning water (26);
    means (42) for creating a permanent circulation of water, such as a mixer and/or a pump;
    means (34) for regulating the temperature of the reconditioning water (26);
    means (40) for measuring and automatically correcting the pH of the reconditioning water (26);
    means (46) for measuring and automatically correcting the electrical conductivity.

11. Installation (10) for implementation of the reconditioning process according to claim 10, characterized in that it comprises at least one tank for storage of the reconditioning water, comprising means for creating a permanent circulation of water and/or means for regulating the temperature of the reconditioning water, and/or means for measuring and automatically correcting the pH of the reconditioning water, and/or means for measuring and automatically correcting the electrical conductivity.

12. Installation (10) for implementation of the reconditioning process according to claim 10, characterized in that it comprises specific lighting means and/or means of monitoring and regulating the temperature of the ambient air so as to favor the housing of the aquatic animals (16).

* * * * *

UNITED STATES PATENT AND TRADEMARK OFFICE
CERTIFICATE OF CORRECTION

PATENT NO.         : 7,114,460 B2                                           Page 1 of 1
APPLICATION NO. : 10/820053
DATED              : October 3, 2006
INVENTOR(S)        : Frederic Amblard It is certified that error appears in the above-identified patent and that said Letters Patent is hereby corrected as shown below:

On the title page, insert Item (30), as follows:

--(30)  Foreign Application Priority Data

April 15, 2003  [FR]  France……………..……..0304672--.

Signed and Sealed this

Nineteenth Day of December, 2006

JON W. DUDAS
*Director of the United States Patent and Trademark Office*